United States Patent
McEntee et al.

(10) Patent No.: US 11,946,442 B2
(45) Date of Patent: Apr. 2, 2024

(54) AUTONOMOUS UNDERWATER VEHICLES

(71) Applicant: Ocean Renewable Power Company, Inc., Portland, ME (US)

(72) Inventors: Jarlath McEntee, Castine, ME (US); Nathanial Hayes, Topsham, ME (US); Millard Firebaugh, Annapolis, MD (US)

(*) Notice: Subject to any disclaimer, the term of this patent is extended or adjusted under 35 U.S.C. 154(b) by 871 days.

(21) Appl. No.: 16/975,554

(22) PCT Filed: Mar. 1, 2018

(86) PCT No.: PCT/US2018/020356
§ 371 (c)(1),
(2) Date: Aug. 25, 2020

(87) PCT Pub. No.: WO2019/168533
PCT Pub. Date: Sep. 6, 2019

(65) Prior Publication Data
US 2020/0400117 A1    Dec. 24, 2020

(51) Int. Cl.
*F03B 17/06*   (2006.01)
*B63G 8/08*   (2006.01)
(Continued)

(52) U.S. Cl.
CPC ............. *F03B 17/065* (2013.01); *B63G 8/08* (2013.01); *B63H 1/08* (2013.01); *F03B 13/10* (2013.01);
(Continued)

(58) Field of Classification Search
CPC ...... F03B 17/065; F03B 13/10; F03B 17/067; F03B 17/063; B63G 8/08; B63H 1/08;
(Continued)

(56) References Cited

U.S. PATENT DOCUMENTS 707,857 A * 8/1902 Marburg ............... F03B 17/063
  416/85
808,034 A * 12/1905 Franklin ................. F04D 25/02
  416/170 R
(Continued)

FOREIGN PATENT DOCUMENTS

WO    8000991 A1    5/1980
WO    2006059094 A1    6/2006
(Continued)

OTHER PUBLICATIONS

Hwang, et al. "Design and Testing of VTOL UAV Cyclocopter with 4 Rotors" American Helicopter Society International, Inc.; May 9-11, 2006; 7 pages.
(Continued)

*Primary Examiner* — Pedro J Cuevas
(74) *Attorney, Agent, or Firm* — Pierce Atwood LLP; Christopher A. Baxter

(57) ABSTRACT

Underwater vehicles capable of self-propulsion are described. An underwater vehicle includes a cross-flow turbine including two or more foils spaced apart from a main shaft. The foils have a pitch that is adjustable under control of a pitch control mechanism. The underwater vehicle also includes a frame supporting the main shaft. The frame enables rotation of the cross-flow turbine. The underwater vehicle additionally includes a generator-motor set including rotor and stator elements. The rotor element is in rotary communication with the main shaft.

25 Claims, 15 Drawing Sheets

(51) Int. Cl.
B63H 1/08 (2006.01)
F03B 13/10 (2006.01)

(52) U.S. Cl.
CPC ........ *F03B 17/067* (2013.01); *F05B 2220/32* (2013.01); *F05B 2240/40* (2013.01); *F05B 2240/97* (2013.01); *F05B 2260/70* (2013.01); *F05B 2260/72* (2013.01); *F05B 2260/87* (2020.08); *Y02E 10/20* (2013.01)

(58) Field of Classification Search
CPC .............. F05B 2220/32; F05B 2240/40; F05B 2240/97; F05B 2260/70; F05B 2260/72; F05B 2260/87; F05B 2250/311; F05B 2250/314; F05B 2250/72; F05B 2260/75; F05B 2260/76; F05B 2260/79; Y02E 10/20; Y02E 10/30; B63B 2035/4466
See application file for complete search history.

(56) References Cited

U.S. PATENT DOCUMENTS

| | | | | |
|---|---|---|---|---|
| 3,978,345 | A * | 8/1976 | Bailey | E02B 9/08 416/111 |
| 3,993,913 | A * | 11/1976 | Dickman | E02B 9/08 290/53 |
| 4,084,102 | A * | 4/1978 | Fry | F03D 13/20 244/33 |
| 4,137,005 | A * | 1/1979 | Comstock | F03B 13/184 415/24 |
| 4,165,468 | A * | 8/1979 | Fry | F03D 13/20 290/55 |
| 4,659,940 | A * | 4/1987 | Shepard | F03D 13/20 416/85 |
| 4,717,832 | A * | 1/1988 | Harris | F03B 17/061 290/43 |
| 4,748,808 | A * | 6/1988 | Hill | F03B 17/063 416/85 |
| 5,451,137 | A * | 9/1995 | Gorlov | F03D 3/062 415/75 |
| 5,451,138 | A * | 9/1995 | Istorik | F03D 13/20 416/178 |
| 5,577,882 | A * | 11/1996 | Istorik | F03D 9/25 416/178 |
| 5,642,984 | A * | 7/1997 | Gorlov | F03D 3/02 416/DIG. 6 |
| 6,036,443 | A * | 3/2000 | Gorlov | F03D 3/062 415/75 |
| 6,155,892 | A * | 12/2000 | Gorlov | F03D 9/32 440/9 |
| 6,253,700 | B1 * | 7/2001 | Gorlov | F03D 3/062 114/274 |
| 6,293,835 | B2 * | 9/2001 | Gorlov | F03B 3/00 440/8 |
| 7,132,760 | B2 * | 11/2006 | Becker | F03D 9/25 290/55 |
| 7,652,388 | B2 * | 1/2010 | Lyatkher | F03B 17/063 290/55 |
| 7,661,922 | B2 * | 2/2010 | Belinsky | F03B 17/063 415/908 |
| 7,902,687 | B2 | 3/2011 | Sauer et al. | |
| 8,219,257 | B2 | 7/2012 | Hunt | |
| 8,222,762 | B2 | 7/2012 | Borgen | |
| 8,579,576 | B2 * | 11/2013 | Fraenkel | F03B 17/061 415/908 |
| 10,634,113 | B2 * | 4/2020 | Sheldon-Coulson | F03B 13/24 |
| 11,028,819 | B2 * | 6/2021 | Sheldon-Coulson | H02K 5/04 |
| 2001/0001299 | A1 * | 5/2001 | Gorlov | F03D 3/061 440/8 |
| 2004/0061337 | A1 * | 4/2004 | Becker | F03D 3/002 416/88 |
| 2007/0231072 | A1 | 10/2007 | Jennings et al. | |
| 2008/0232965 | A1 * | 9/2008 | Fraenkel | F03B 17/061 416/85 |
| 2009/0091134 | A1 * | 4/2009 | Lyatkher | F03B 13/20 290/43 |
| 2009/0129928 | A1 * | 5/2009 | Sauer | F03B 13/264 290/43 |
| 2010/0296913 | A1 * | 11/2010 | Lee | F03D 3/02 290/44 |
| 2011/0012361 | A1 | 1/2011 | Lee | |
| 2013/0045080 | A1 | 2/2013 | Kirke | |
| 2019/0203689 | A1 * | 7/2019 | Sheldon-Coulson | H02K 7/183 |
| 2020/0102931 | A1 * | 4/2020 | Koch | F03D 9/25 |
| 2020/0224634 | A1 * | 7/2020 | Sheldon-Coulson | H02K 7/183 |
| 2022/0252036 | A1 * | 8/2022 | Chen | F03B 3/145 |

FOREIGN PATENT DOCUMENTS

| | | | | |
|---|---|---|---|---|
| WO | | 2008051455 A2 | 5/2008 | |
| WO | WO-2011130797 A1 * | | 10/2011 | ............ F03D 3/068 |
| WO | | 2017191666 A1 | 11/2017 | |

OTHER PUBLICATIONS

Shrestha, et al "Development of a meso-scale cycloidal-rotor aircraft for micro air vehicle application" International Journal of Micro Air Vehicles; 2017; vol. 9; No. 3; pp. 218-231.

Yun, et al "Thrust Control Mechanism of VTOL UAV Cyclocopter with Cycloidal Blades System" Journal of Intelligent Material and Structure; Nov. 2005; 12 pages.

Office Action received in European Application No. 18907541.9 dated Jun. 13, 2023, 6 pages.

\* cited by examiner

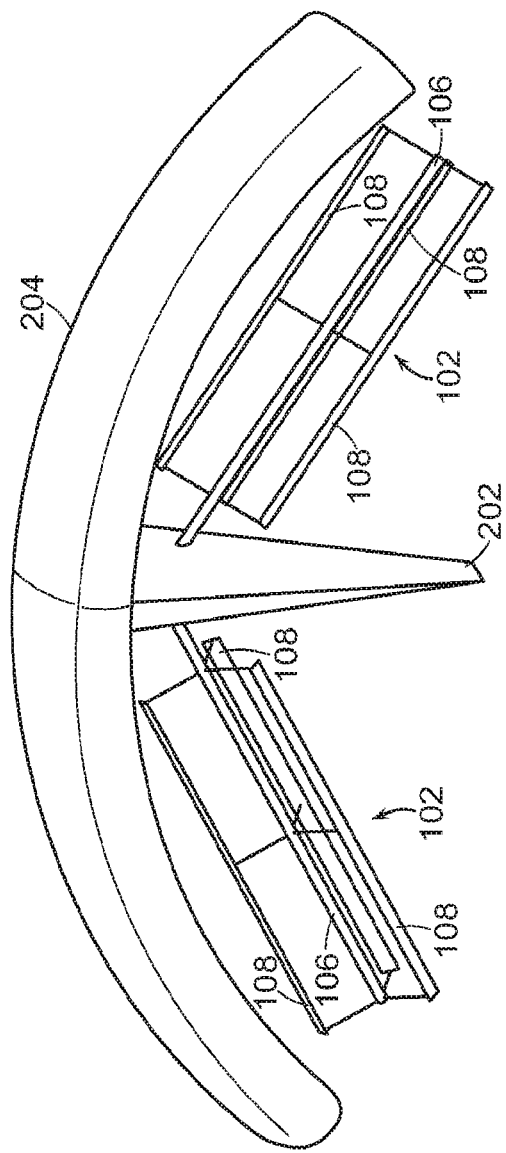

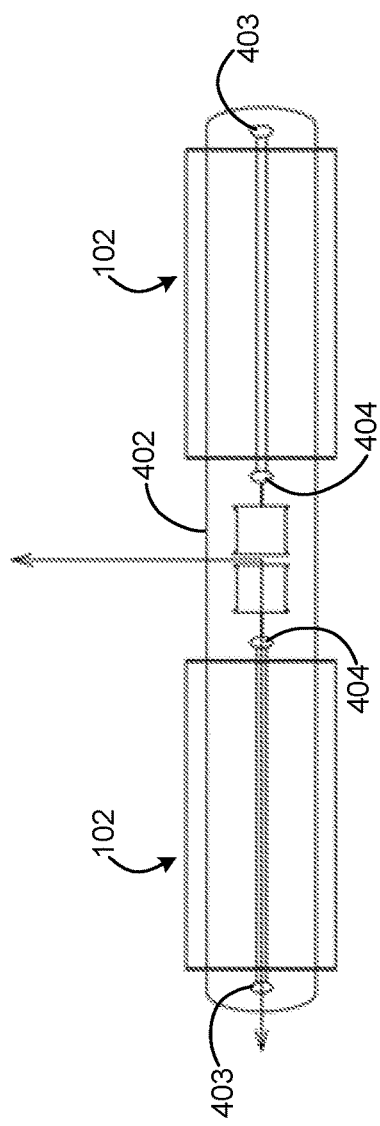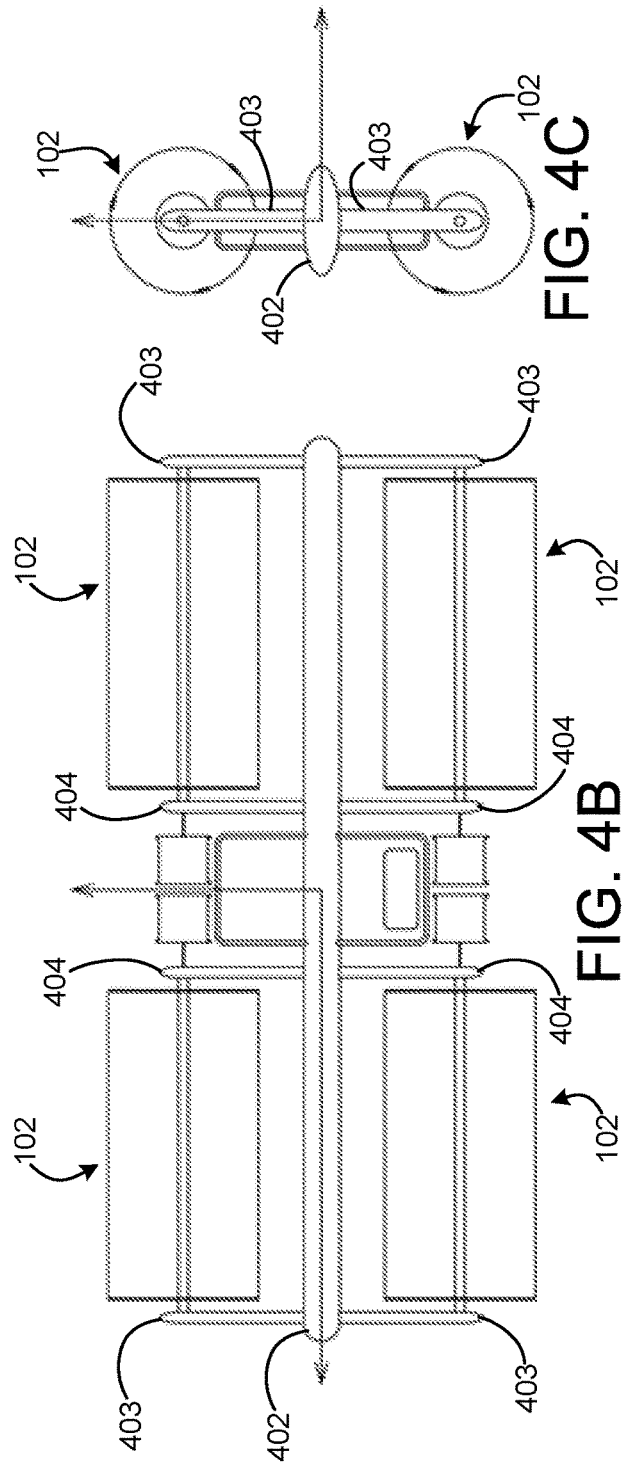

AUTONOMOUS UNDERWATER VEHICLES

TECHNICAL FIELD

The present application relates to autonomous underwater vehicles and, more particularly, to autonomous underwater vehicles configured with power generation and propulsion modes.

BACKGROUND

Marine hydrokinetic (MHK) cross-flow turbines have the ability to provide convenient renewable electric power near coasts and tidal inlets where people tend to live. An example of an MHK unit that has been developed by Ocean Renewable Power Company, LLC (ORPC) is disclosed in PCT Publication No. WO 2010/114794.

Operation and maintenance costs of offshore devices are extremely high due to accessibility challenges. The cost of heavy lift assets required to install or retrieve MHK units is large; suitable weather windows at sea are critical for operations; and the high flow speed environment contributes to large loadings on structures and installation assets.

Existing approaches for deployment and installation of MHK units are based on techniques developed for near shore, shallow water, construction techniques developed for the oil and gas industry and increasingly for the off-shore wind industry. Lift capabilities of these assets must be significantly discounted due to the normal roll and pitching experienced by the support vessel and, as such, equipment is typically oversized for the given lift. This adds substantial costs to deployment and retrieval operations.

The U.S. Department of Energy, National Renewable Energy Laboratory, academia, and industry have developed a roadmap for MHK-derived energy generation. The roadmap estimates installed capacity of 15 GW of wave and tidal power systems by the year 2030. The worldwide industrial goal for installed capacity is 337 GW by the year 2050.

SUMMARY

Disclosed herein are underwater vehicles including at least one active pitch cross-flow turbine. The active pitch cross-flow turbine may be used in both power generation and underwater propulsion modes. The active pitch cross-flow turbine actively adjusts the pitch on individual turbine foils to generate thrust. An active pitch cross-flow turbine may actively adjust pitch in response to water flow through the turbine to optimize the forces on each turbine foil at different stages of the turbine's radial motion. The active pitch cross-flow turbine(s) of an underwater vehicle actively adjusts the pitch of turbine foils to generate thrust used by the underwater vehicle to transit from one place to another.

An underwater vehicle may include a power supply, e.g., a battery pack, to drive motors attached to an active pitch cross-flow turbine. An underwater vehicle may include one or more onboard rechargeable power storage devices, e.g., rechargeable batteries or capacitors (including supercapacitors), enabling autonomous operation whereby an active pitch cross-flow turbine functions as a generator to charge the power storage device as needed.

The underwater vehicles of the present disclosure provide innovative approaches to, for example, deployment, installation, and maintenance of MHK units. The underwater vehicles remove the need for heavy lift assets for MHK unit deployment, installation, and maintenance. Moreover, the underwater vehicles allow for deployment during a wide range of tide and current conditions. The underwater vehicles of the present disclosure may perform operations requiring movement of an MHK unit, including, without limitation, partial or complete installation and/or retrieval of the MHK unit and adjusting and/or repositioning the MHK unit. In addition, the underwater vehicles may allow for smaller, more efficient foundations for MHK units. The underwater vehicles of the present disclosure offer the potential for large reductions in project operation and maintenance costs. The underwater vehicles may also function as underwater vehicles irrespective of their MHK unit utility.

An aspect of the present disclosure relates to an underwater vehicle including a cross-flow turbine including two or more foils spaced apart from a main shaft. The foils have a pitch that is adjustable under control of a pitch control mechanism. The underwater vehicle also includes a frame supporting the main shaft. The frame enables rotation of the cross-flow turbine. The underwater vehicle additionally includes a generator-motor set including rotor and stator elements. The rotor element is in rotary communication with the main shaft.

Additional objects and advantages of the present disclosure will be set forth in part in the description that follows, and in part will be obvious from the following description, or may be learned by practice of the present disclosure. The objects and advantages of the present disclosure will be realized and attained by means of the elements and combinations particularly pointed out in the following description and claims.

BRIEF DESCRIPTION OF THE DRAWINGS

For a more complete understanding of the present disclosure, reference is now made to the following description taken in conjunction with the accompanying drawings.

FIG. 2 is a perspective view of an underwater vehicle including two cross-flow turbines according to embodiments of the present disclosure.

FIG. 4A is a top or bottom view of an underwater vehicle including four cross-flow turbines according to embodiments of the present disclosure.

FIG. 4B is a front or back view of the underwater vehicle of FIG. 4A according to embodiments of the present disclosure.

FIG. 4C is a side view of the underwater vehicle of FIGS. 4A and 4B according to embodiments of the present disclosure.

DETAILED DESCRIPTION

Various embodiments will now be explained in detail. It is to be understood that both the foregoing general description and the following detailed description are illustrative only, and are not restrictive. Any discussion of certain embodiments or features serves to illustrate certain aspects of the present disclosure. The present disclosure is not limited to the embodiments specifically described herein.

Unless otherwise indicated, all numbers such as those expressing temperatures, weight percents, concentrations, time periods, dimensions, and values for certain parameters or physical properties are to be understood as being modified in all instances by the term "about." All measurements are subject to uncertainty and experimental variability.

Figure 1B:
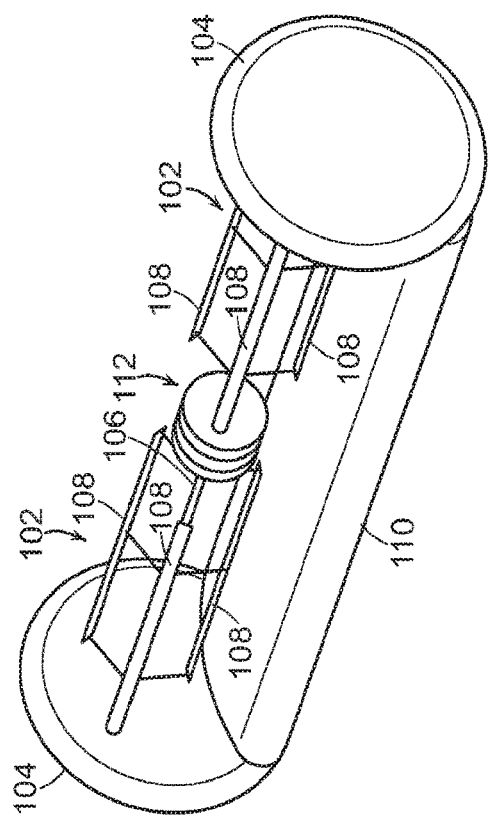
FIG. 1B is a perspective view of the underwater vehicle of FIG. 1A according to embodiments of the present disclosure.
Figure 1A:
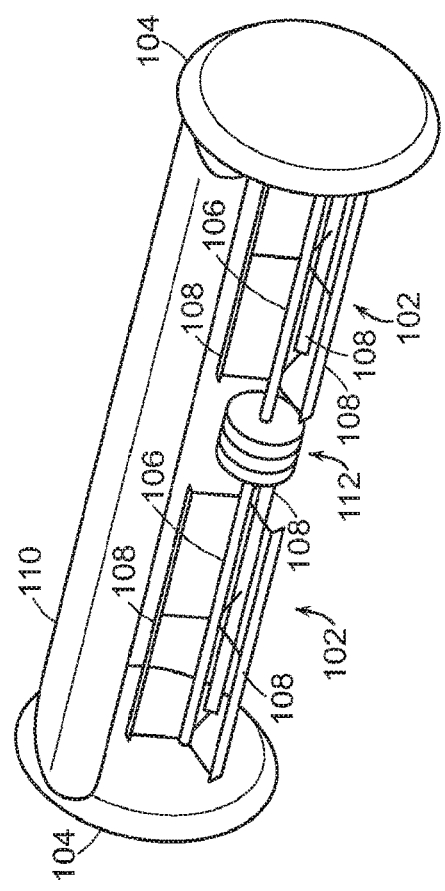
FIG. 1A is a perspective view of an underwater vehicle including two cross-flow turbines according to embodiments of the present disclosure.

FIGS. 1A and 1B illustrate an underwater vehicle including two cross-flow turbines 102. Each cross-flow turbine 102 includes a main shaft 106 and foils 108 spaced apart from the main shaft 106. The main shafts 106 of the cross-flow turbines 102 may extend along the same axis. As illustrated, each cross-flow turbine 102 includes three foils 108. However, one skilled in the art will appreciate that each cross-flow turbine 102 may include as few as two foils 108 or more than three foils 108. Moreover, while FIGS. 1A and 1B illustrate each cross-flow turbine 102 as having the same number of foils 108, one skilled in the art will appreciate that the cross-flow turbines 102 of a single underwater vehicle according to the present disclosure may have different numbers of foils 108.

One or more generators and one or more motors may collectively be referred to as a generator-motor set. A generator-motor set enables the cross-flow turbines 102 to operate in either a power generation mode, e.g., where rotation of the cross-flow turbines 102 results in power being built up in the generator(s), or a propulsion mode, e.g., where rotation of the cross-flow turbines 102 results in the underwater vehicle being propelled through water.

The cross-flow turbines 102 are coupled to a frame that enables the cross-flow turbines 102 to rotate and thereby either generate power for storage or propel the underwater vehicle. As illustrated in FIGS. 1A and 1B, the frame may include external terminal components 104. An external terminal component may provide structure support to the underwater vehicle. An external terminal component may also couple to one or more bearings attached to one or more main shafts 106, thereby providing structure that enables the cross-flow turbine(s) 102 to rotate. An external terminal component may be an outward most component located on an axis that mains shafts 106 of cross-flow turbines 102 extend along. While the external terminal components 104 are illustrated as being circular, other shapes may be used, including but not limited to those additionally disclosed herein.

The underwater vehicle may also include one or more nacelles 110/112. A nacelle, such as the nacelle 110, may form part of the frame and thereby provide structural support to the underwater vehicle.

A nacelle may also or alternatively contribute to a desired buoyancy of an underwater vehicle. For example, a nacelle may comprise a foam material; a foam material surrounded by a composite material, e.g., fiberglass or carbon fiber; a foam material with a thermoplastic covering; a foam material with a steel, aluminum, or titanium shell; a sealed structure with gas, e.g., air, inside; a structure opened to the flow of water; a structure with an air bag inside; or some other composition.

A nacelle may also include various electrical and mechanical components of an underwater vehicle. For example, a nacelle may surround one or more power storages, one or more generators, and/or one or more motors.

As illustrated in FIGS. 1A and 1B, the nacelle 110 that extends parallel or substantially parallel to the main shafts 106. Moreover, the nacelle 110 may couple to the external terminal components 104. In addition, the nacelle 110 may be configured to act as an anchor when it is below the cross-flow turbines 102, as illustrated in FIG. 1B.

FIG. 2 illustrates a variant of the underwater vehicle including two cross-flow turbines 102. As illustrated in FIG. 2, the frame does not include terminal components 104. Instead, the frame includes a nacelle 202 that extends between the cross-flow turbines 102. The nacelle 202 may encompass power storages, generators, motors, and various other mechanical and electronic components of the underwater vehicle. The nacelle 202 may be shaped to condition flow of water to the cross-flow turbines 102. The nacelle 202 may also be made of a material and/or filled with a material that allows the nacelle 202 to contribute buoyancy to the underwater vehicle.

The frame additionally includes a nacelle 204 coupled to the nacelle 202 and that extends along the cross-flow turbines 102. As illustrated, the nacelle 204 is arcuate to a degree that enables the nacelle 204 to effectively condition the flow of water to the cross-flow turbines 102. The cross-flow turbines 102 may be angled with respect to each other to provide lateral, vertical, and longitudinal thrust for maneuvering the underwater vehicle.

One skilled in the art will appreciate that the nacelle 204 could have less of an arc (or no arc) or more of an arc depending on the angle between the cross-flow turbines 102.

For example, the more planar the cross-flow turbines 102 are oriented, the less arc the nacelle 204 may have. In view of this, one skilled in the art will appreciate that the nacelle 110 illustrated in FIGS. 1A and 1B may be arcuate if the cross-flow turbines 102 in FIGS. 1A and 1B are not planar.

As described above, an underwater vehicle may include two cross-flow turbines 102. There may be instances in which an underwater vehicle including more than two cross-flow turbines 102 may be beneficial. Having more than two cross-flow turbines 102 may provide greater propulsion as well as greater rotational stability, which may be beneficial in certain underwater conditions. In a propulsion mode, for example, direction of rotation of one or more cross-flow turbines 102 may result in rotational change in the assembled array of cross-flow turbines 102.

Figure 3:
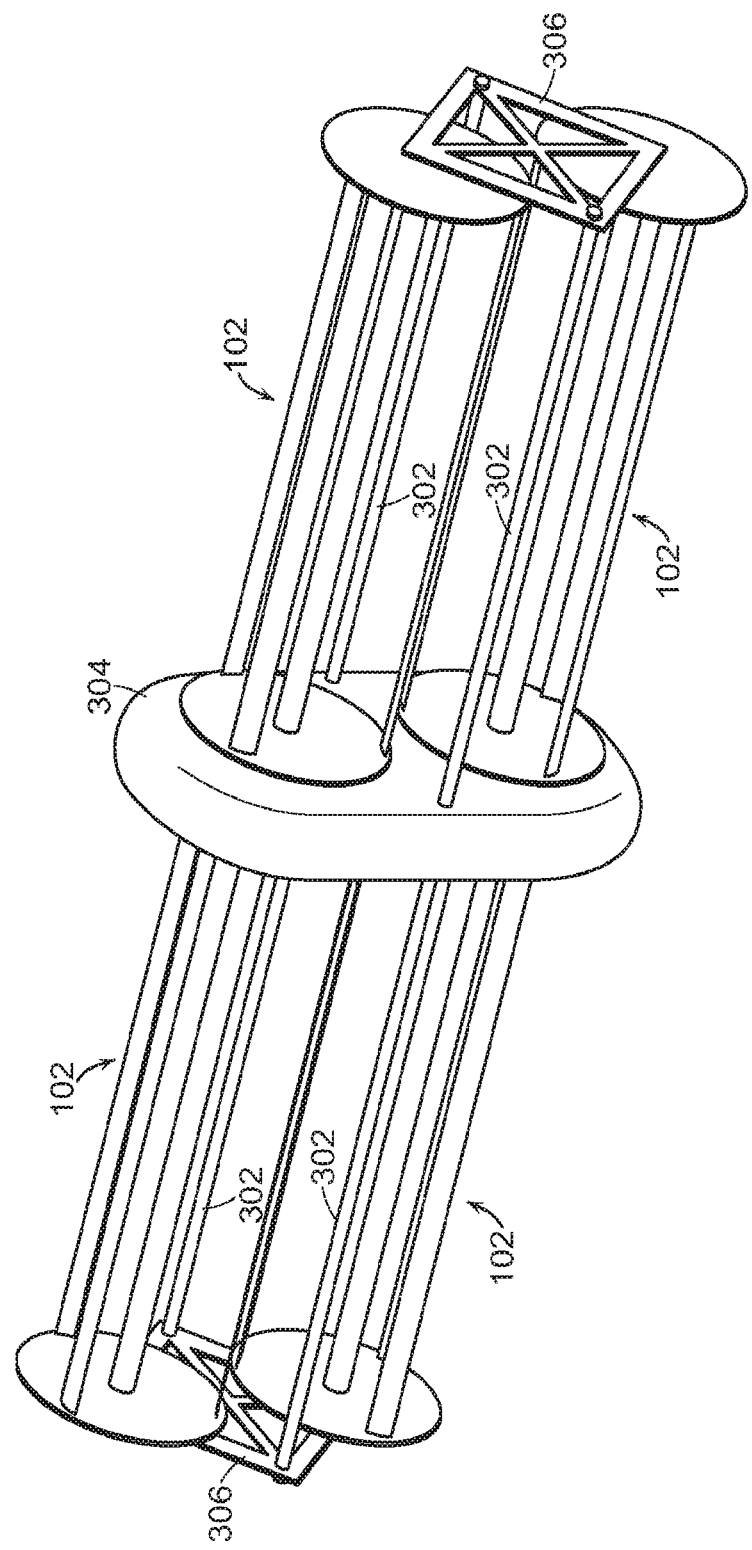
FIG. 3 is a perspective view of an underwater vehicle including four cross-flow turbines according to embodiments of the present disclosure.

FIG. 3 illustrates an underwater vehicle including four cross-flow turbines 102. Two or more of the cross-flow turbines 102 may be parallel, or substantially parallel, with respect to each other.

The underwater vehicle of FIG. 3 has a frame including a nacelle 304, elongated members 302, and external terminal components 306. The nacelle 304 extends between the cross-flow turbines 102, and may couple to the cross-flow turbines 102. In contrast to the external terminal components 104 of FIGS. 1A and 1B, the external terminals components 306 in FIG. 3 are not coupled to a nacelle. Instead, the external terminal components 306 are in communication with the nacelle 304 by the elongated members 302. Moreover, in contrast to the external terminal components 104 in FIGS. 1A and 1B, the external terminal components 306 illustrated in FIG. 3 include apertures that enable water to pass there through as well as enable the underwater vehicle to have less weight.

FIGS. 4A through 4C illustrate a variant of an underwater vehicle including four cross-flow turbines 102. Each cross-flow turbine 102 may rotate at differing speeds and with differing pitching amplitudes and phases.

The underwater vehicle of FIGS. 4A through 4C has a frame including a nacelle 402 that extends between all four cross-flow turbines 102, e.g., along an axis parallel to one or more axes that the main shafts 106 extend along. The nacelle 402 couples to external terminal components 403. For example, each cross-flow turbine 102 may couple to a different external terminal component 403 that couples to the nacelle 402 (as illustrated). Alternatively, a single external terminal component 403 may couple to the nacelle 402 and two cross-flow turbines 102, with the two cross-flow turbines 102 extending parallel, or substantially parallel, to each other, e.g., the two cross-flow turbines 102 on the left half of the underwater vehicle in FIG. 4B.

The frame may also include internal terminal components 404 that couple to the nacelle 402. An internal terminal component may provide structure support to the underwater vehicle. An internal terminal component may also couple to one or more bearings attached to one or more main shafts 106, thereby providing structure that enables the cross-flow turbine(s) 102 to rotate.

Each cross-flow turbine 102 may couple to a different internal terminal component 404 (as illustrated). Alternatively, a single internal terminal component 404 may couple to the nacelle 402 and two cross-flow turbines 102, with the two cross-flow turbines 102 extending parallel, or substantially parallel, to each other, e.g., the two cross-flow turbines 102 on the left half of the underwater vehicle in FIG. 4B.

In a four cross-flow turbine 102 array (such as that illustrated in FIGS. 4A through 4C), the main shafts 106 of two cross-flow turbines 102 may extend along a single axis.

Moreover, the main shaft 106 of one cross-flow turbine 102 of the array may extend along an axis parallel to an axis that a main shaft 106 of another cross-flow turbine 102 extends along.

Figure 5:
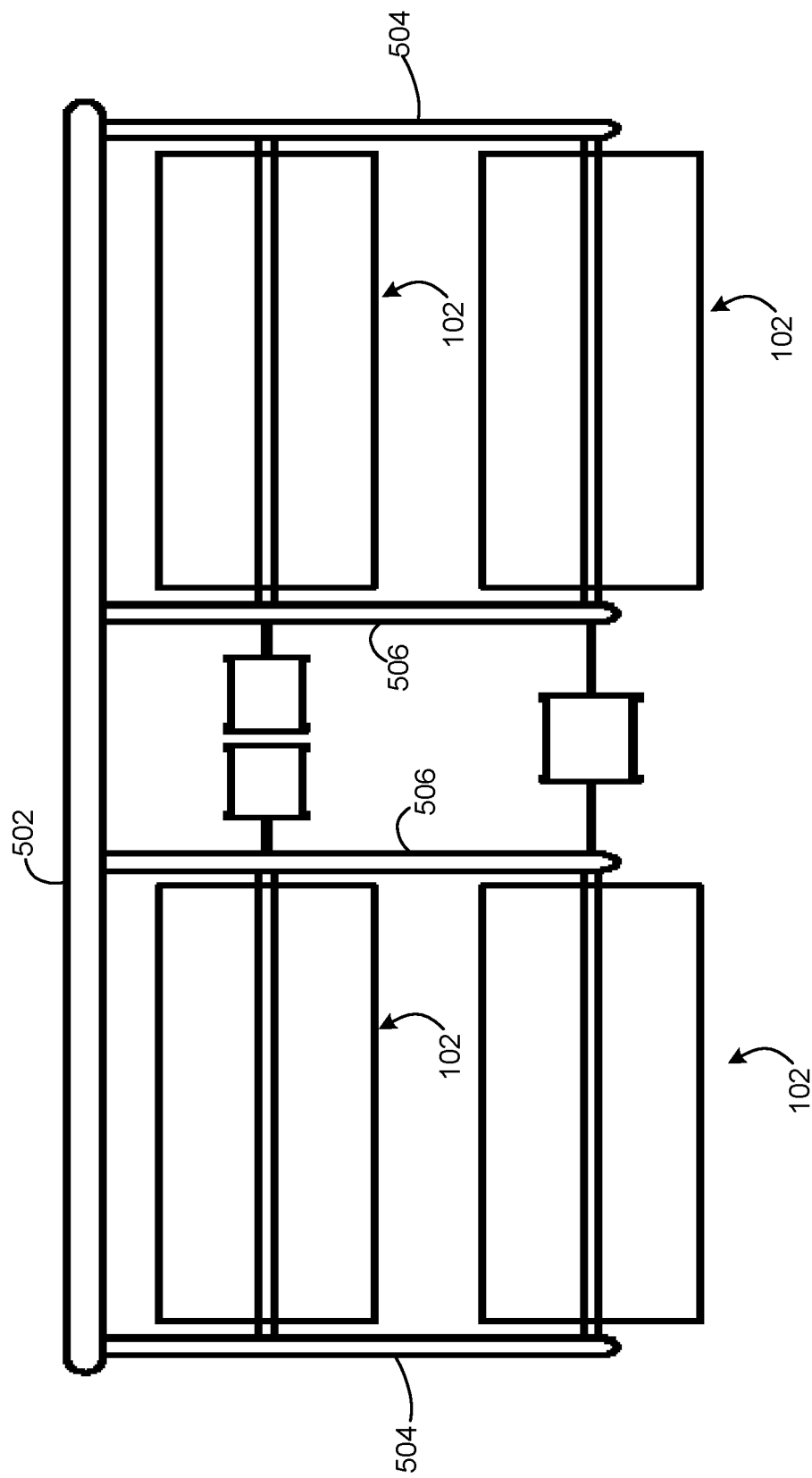
FIG. 5 is a front or back view of an underwater vehicle including four cross-flow turbines according to embodiments of the present disclosure.

FIG. 5 illustrates another variant of an underwater vehicle including four cross-flow turbines 102. The underwater vehicle illustrated in FIG. 5 has a frame including a nacelle 502 that extends proximate to two of the cross-flow turbines 102. The nacelle 502 extends along an axis parallel to one or more axes that that one or more main shafts 106 extend along. External terminal components 504 couple to end portions of the nacelle 502. Each external terminal component 504 may couple to two cross-flow turbines 102, e.g., two cross-flow turbines 102 that extend parallel or substantially parallel to each other. The frame also includes internal terminal components 506 that couple to the nacelle 502. Each internal terminal component 506 may couple to two cross-flow turbines 102, e.g., two cross-flow turbines 102 that extend parallel or substantially parallel to each other.

As illustrated by the top two cross-flow turbines 102 in FIG. 5, each cross-flow turbine 102 may be coupled to respective electrical and/or mechanical components, e.g., power storage, generators, or motors. This enables each cross-flow turbine 102 to rotate independently of another cross-flow turbine 102. For example, the cross-flow turbines 102 may be rotated in opposite directions to provide counter torque to balance the underwater vehicle without the need for external stabilizers. Alternatively, as illustrated by the bottom two cross-flow turbines 102 in FIG. 5, multiple cross-flow turbines 102 may share electrical and/or mechanical components including a single main shaft in rotational communication with a single motor-generator set. Coupling a single cross-flow turbine 102 to respective electrical and/or mechanical components provides more degrees of control over the underwater vehicle, while potentially requiring more electronics. Thus, whether electrical and/or mechanical components are coupled to one or more than one cross-flow turbine 102 may be dependent on a desired cost of the underwater vehicle, desired weight of the underwater vehicle, as well as other considerations.

Figure 6:
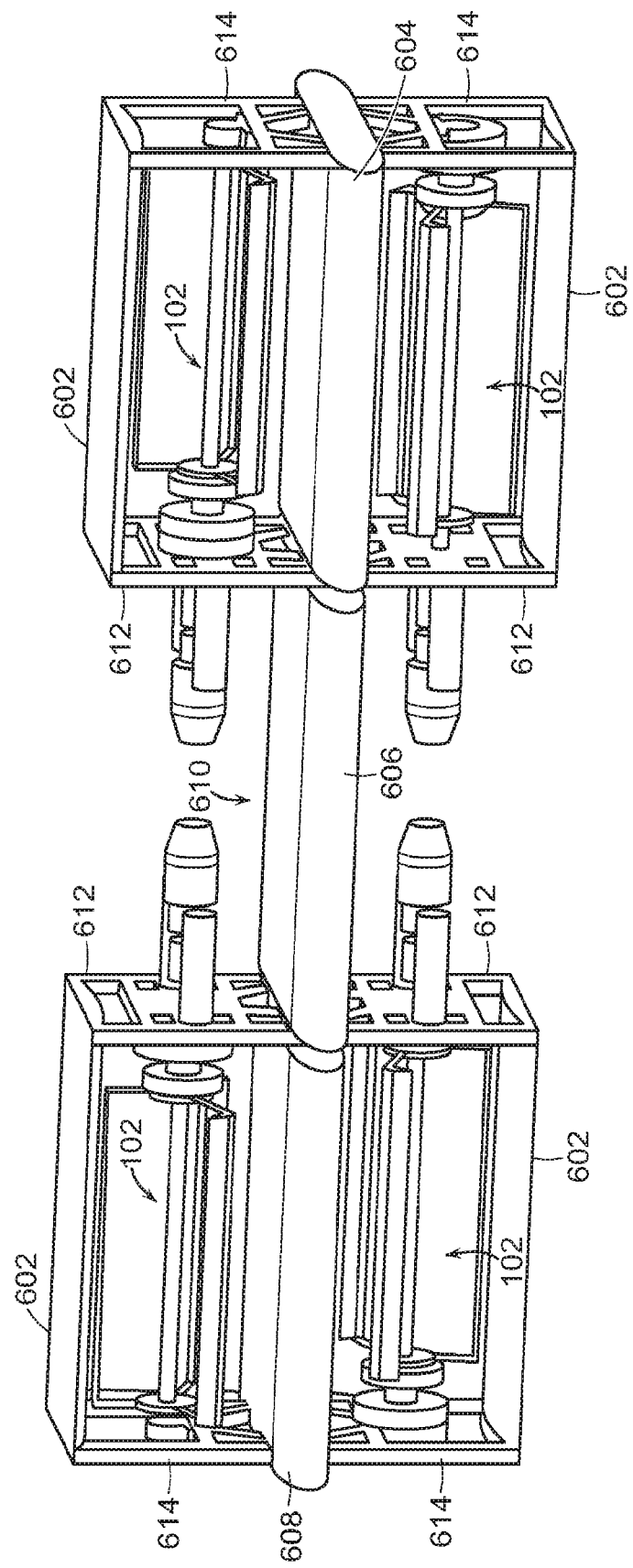
FIG. 6 is a perspective view of an underwater vehicle including four cross-flow turbines according to embodiments of the present disclosure.

FIG. 6 illustrates a further variant of an underwater vehicle including four cross-flow turbines 102. The underwater vehicle in FIG. 6 has a frame including a nacelle 610 that extends between all four cross-flow turbines 102. The nacelle 610 includes slots that enable internal terminal components 612 to extend through the nacelle 610 and that create distinct portions 604/606/608 in the nacelle 610. The portions 604/606/608 may be identical or different in shape. For example, the portions 604/608 may be identical and the portion 606 may be different from the portions 604/608. Shaping of the portions 604/606/608 may be configured or optimized based on underwater conditions in which the underwater vehicle is to operate.

The frame of the underwater vehicle of FIG. 6 includes further nacelles 602. Each nacelle 602 may couple an external terminal component 614 to an internal terminal component 612. Moreover, each nacelle 602 may extend along an axis parallel to one or more axes that one or more main shafts 106 extend along. The nacelles 602 may be identical or different in shape. Each nacelle 602 may extend in plane with another nacelle 602 and parallel to two other nacelles 602.

Figure 7:
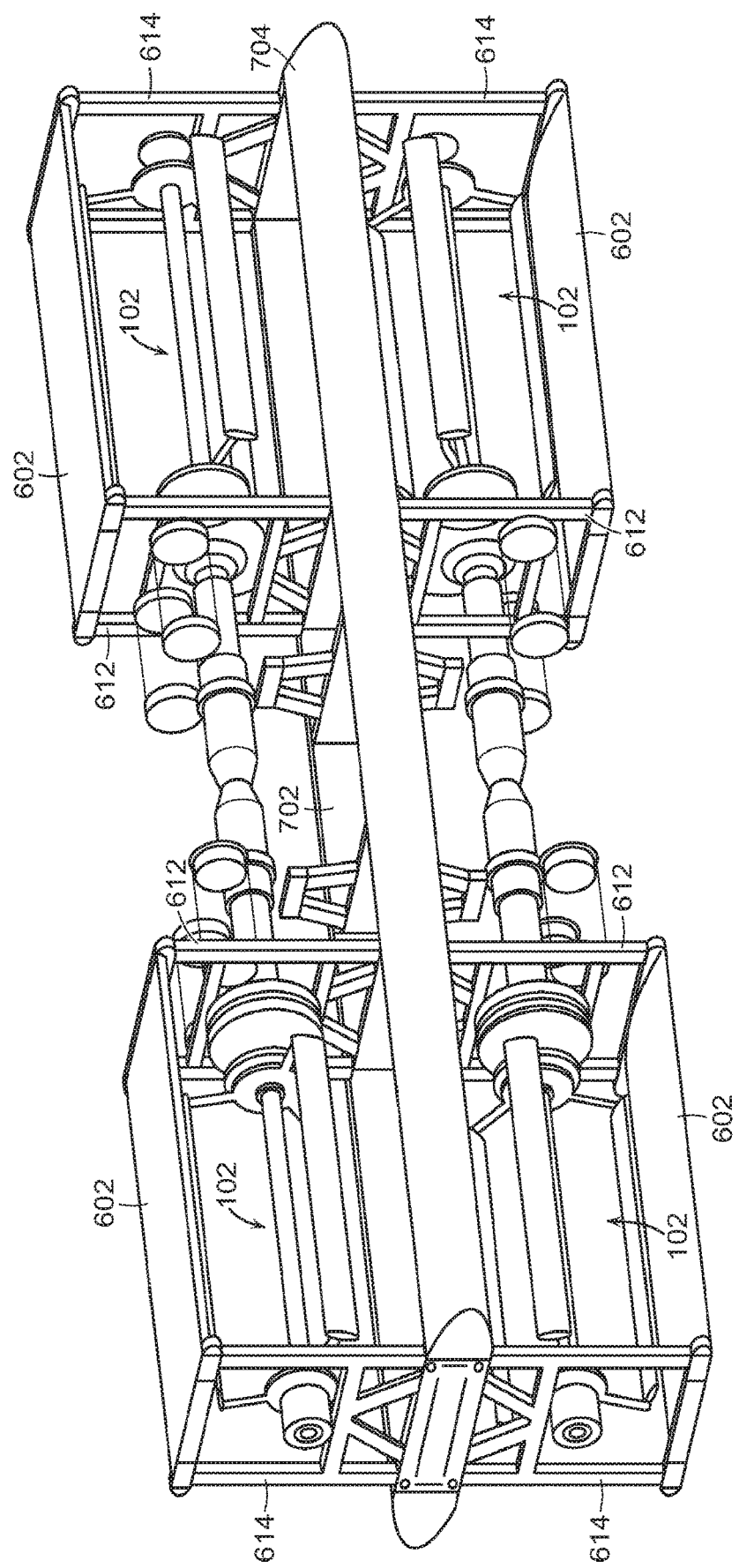
FIG. 7 is a perspective view of an underwater vehicle including four cross-flow turbines according to embodiments of the present disclosure.

FIG. 7 illustrates yet another variant of an underwater vehicle including four cross-flow turbines 102. The underwater vehicle in FIG. 7 has a frame including a first nacelle 702 and a second nacelle 704 that each extends along the same plane. The plane that the nacelles 702/704 extend may be parallel to one or more axes that the cross-flow turbines 102 extend along. Each nacelle 702/704 may couple to external terminal components 614 and internal terminal components 612, but the nacelles 702/704 may be spaced apart from each other. The nacelles 702/704 may be identical or different in size, shape, material, etc. Using the two nacelles 702/704 instead of the one nacelle 610 may result in a different conditioning of water flow to the cross-flow turbines 102.

Described above are underwater vehicles including various nacelle configurations. One skilled in the art will appreciate that different nacelles may have different benefits in different underwater conditions.

As illustrated in the figures, the external terminal components of an underwater vehicle may have the same structure as the internal terminal components of the underwater vehicle. However, one skilled in the art will appreciate that the external terminal components of an underwater vehicle may have different structures from the internal terminal components of the underwater vehicle without departing from the present disclosure.

Figure 8:
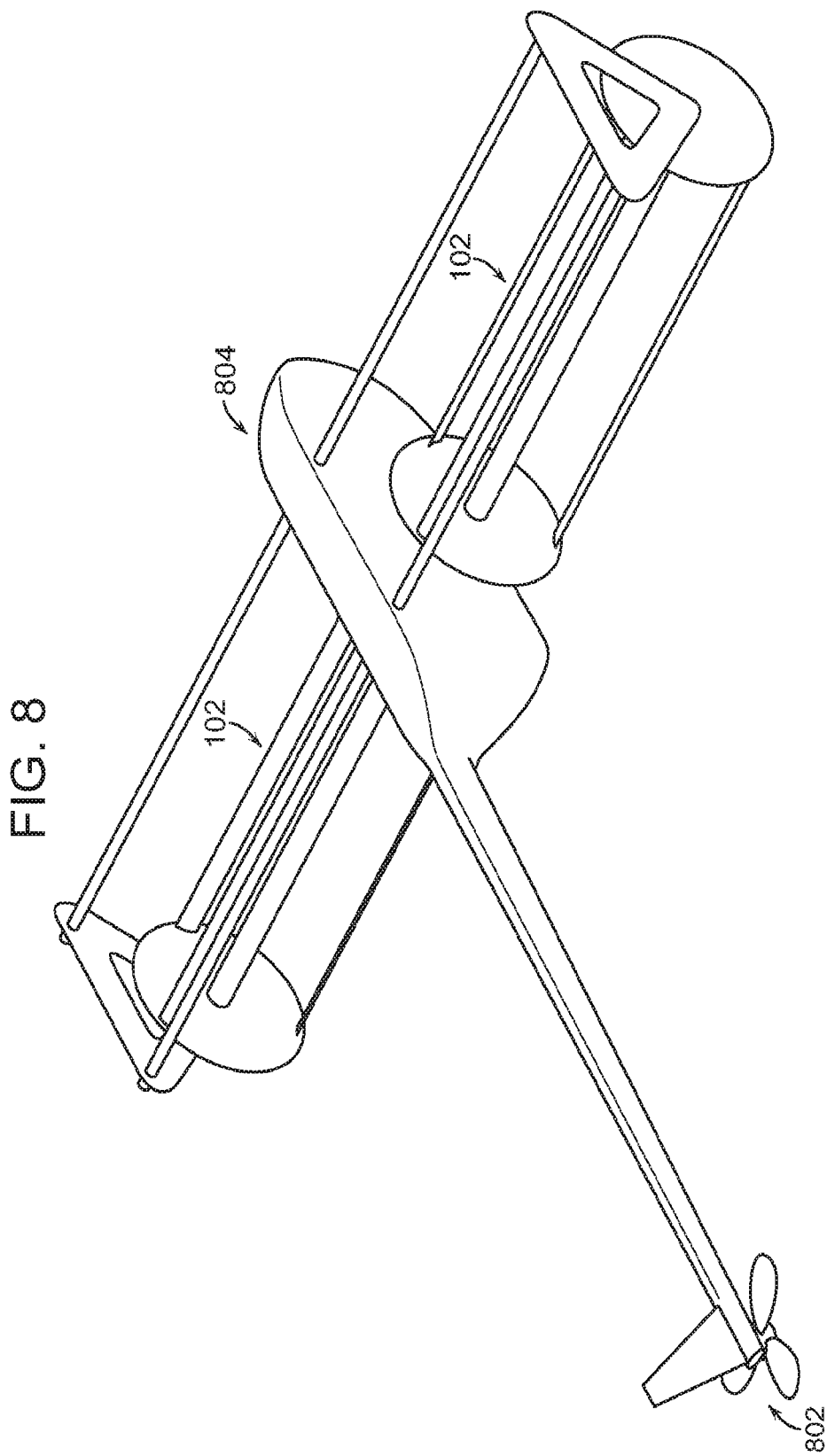
FIG. 8 is an elevated perspective view of an underwater vehicle including a tail rotor according to embodiments of the present disclosure.

It may be desirable for an underwater vehicle to include components capable of stabilizing movement of the underwater vehicle. FIG. 8 illustrates an underwater vehicle including a nacelle 804 with a tail rotor 802. The tail rotor 802 provides a righting moment. Moreover, the tail rotor 802 enables rotation of the underwater vehicle (e.g., about the main shafts 106) to be better controlled. A tail rotor 802 may be beneficial for both an underwater vehicle including two cross-flow turbines 102 (as illustrated in FIG. 8) or four cross-flow turbines 102. However, if an underwater vehicle including four cross-flow turbines 102 is configured correctly, the four cross-flow turbines 102 may stabilize rotation of the underwater vehicle, thereby negating any necessity of the tail rotor 802.

Figure 9:
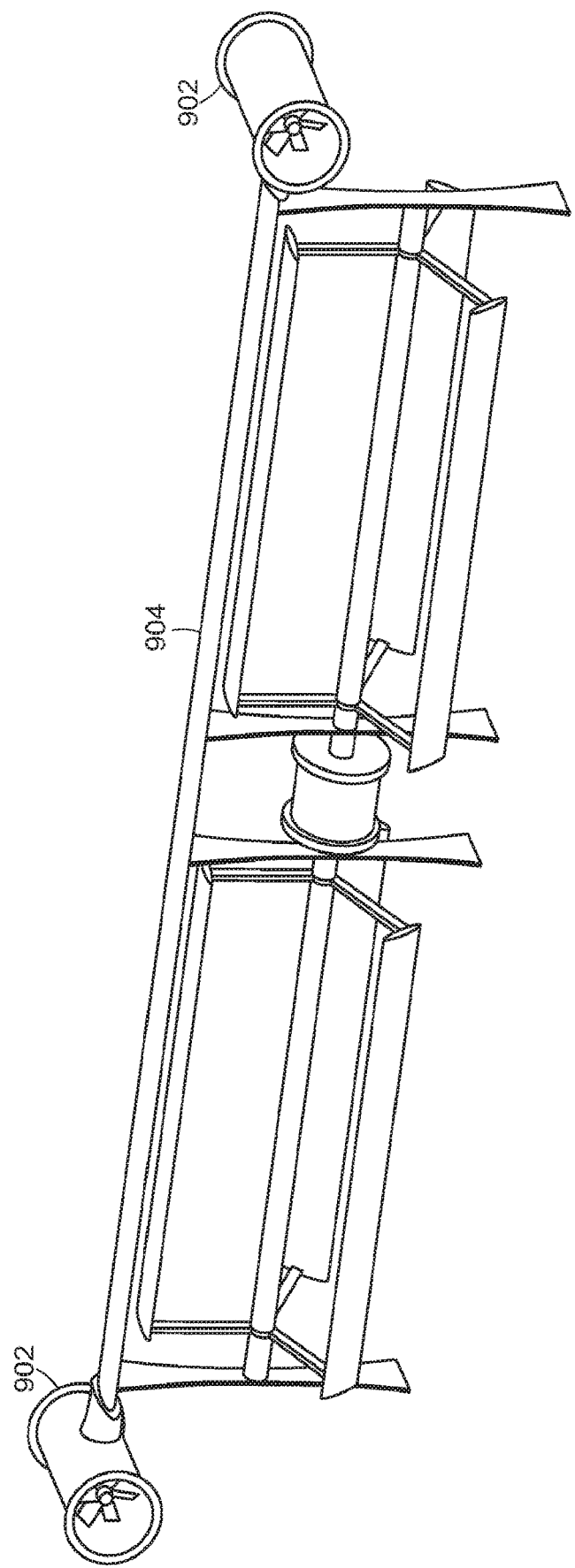
FIG. 9 is a perspective view of an underwater vehicle including two cross-flow turbines and thrusters according to embodiments of the present disclosure.
Figure 10:
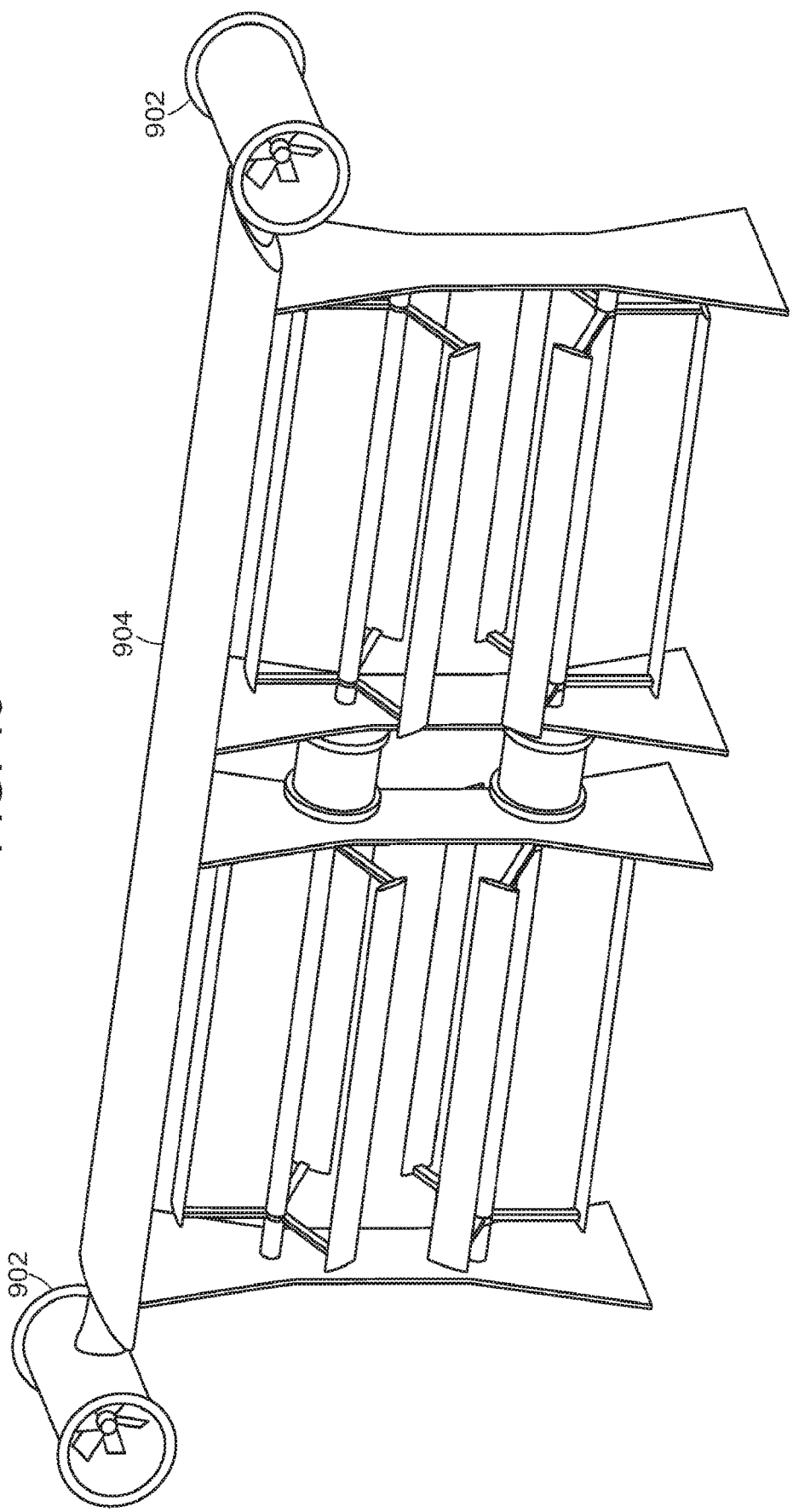
FIG. 10 is a perspective view of an underwater vehicle including four cross-flow turbines and thrusters according to embodiments of the present disclosure.

FIGS. 9 and 10 illustrate underwater vehicles including side thrusters 902 that may assist in maneuvering the underwater vehicles. As illustrated, the side thrusters 902 are vertically offset side thrusters (VOSTs). The side thrusters 902 couple to a nacelle 904 of a frame of an underwater vehicle. Thus, the side thrusters 902 may couple to a nacelle 904 that extends between four cross-flow turbines 102 of an underwater vehicle, such as the nacelles illustrated in FIGS. 4, 6, and 7. The thrusters may work when the underwater vehicle is in a propulsion mode.

Described herein are underwater vehicles including two cross-flow turbines 102 or four cross-flow turbines 102. One skilled in the art will appreciate that underwater vehicles within the scope of the present disclosure may include other amounts of cross-flow turbines 102.

Figure 11:
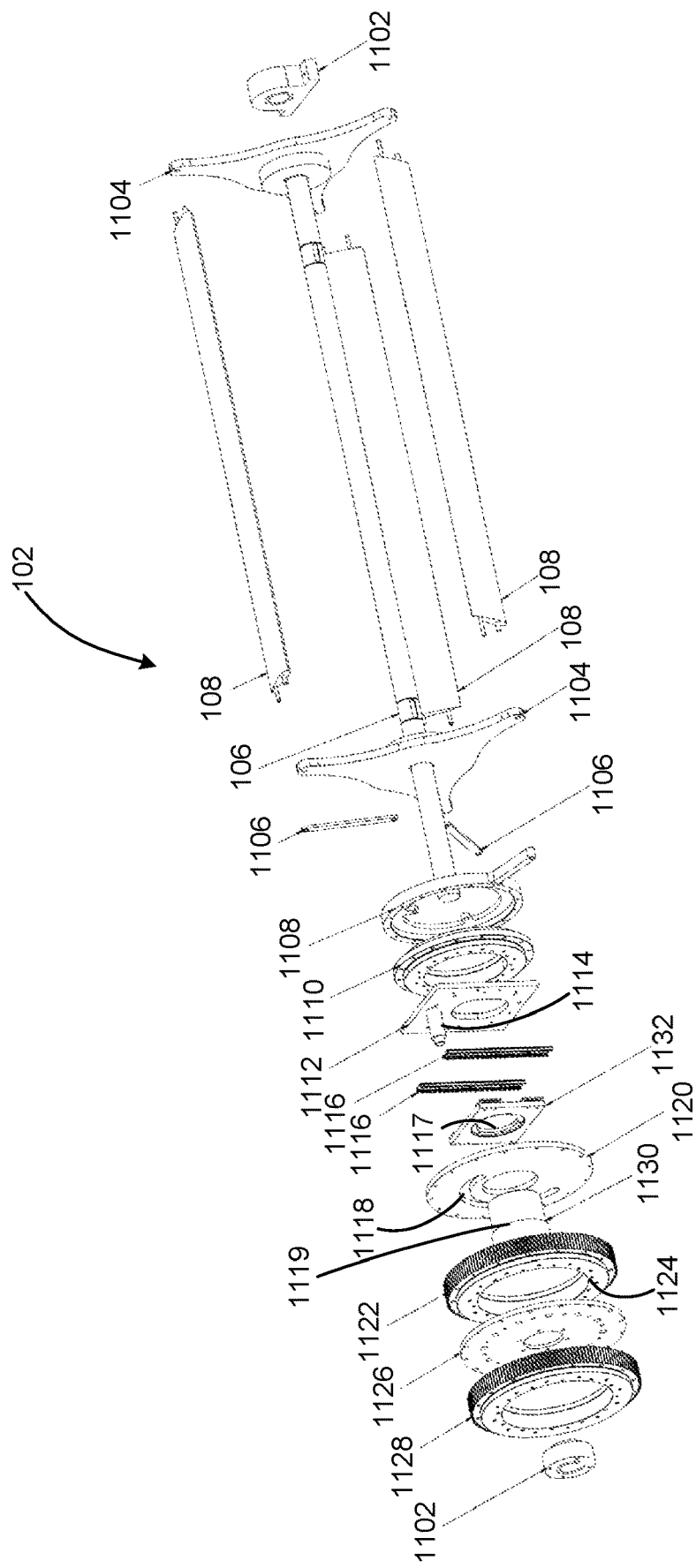
FIG. 11 is an exploded view of a cross-flow turbine including a pitch control mechanism according to embodiments of the present disclosure.

Some or all cross-flow turbines 102 of an underwater vehicle may include a pitch control mechanism that enables the underwater vehicle to experience different thrust vectors, thereby moving the underwater vehicle through water. FIG. 11 illustrates a cross-flow turbine 102 including a pitch control mechanism.

The cross-flow turbine 102 includes the main shaft 106 that rotates within bearings 1102 that are coupled to, for example, a frame of the underwater vehicle. The cross-flow turbine 102 includes end disks 1104 that couple to the foils 108, e.g., at quarter (¼) chord positions, to radially offset the foils 108 with respect to the main shaft 106. Each foil 108 may rotate with respect to the end disks 1104, at the locations at which the foil 108 is coupled to the end disks 1104, based on a configuration of the pitch control mechanism as described below. As illustrated, the cross-flow turbine 102 includes three foils 108. One skilled in the art will appreciate that the cross-flow turbine 102 may include more or less than three foils.

Two of the foils 108 may couple to follower foil links 1106, e.g., at three-quarter (¾) chord positions. A third foil 108 may couple, e.g., at a three-quarter (¾) chord position, to an index foil link 1108, and more particularly to an elongated member that extends radially from a center of the index foil link 1108. The index foil link 1108 is coupled to one half of an offset disk slewing bearing 1110, which rotates about the main shaft 106 as the cross-flow turbine 102 rotates. Each follower foil link 1106 may be an elongated component. One end portion of a follower foil link 1106 may couple to a foil 108, as described above, and another end portion of the follower foil link 1106 may couple to the index foil link 1108. Pitching of the foils 108 may be controlled by a configuration of the index foil link 1108 as described below.

A second half of the offset disk slewing bearing 1110, which does not rotate about the main shaft 106 as the cross-flow turbine 102 rotates, is coupled to an offset disk cam plate 1112. The offset disk cam plate 1112 includes offset disk rails 1116 and a cam follower 1114, which protrudes from the offset disk cam plate 1112. The cam follower 1114 is configured to slide in a spiral slot 1118 of an amplitude gear spiral plate 1120. The amplitude gear spiral plate 1120 is coupled to an amplitude slewing gear 1122.

The amplitude slewing gear 1122 includes a bearing assembly 1124. The bearing assembly 1124 is coupled to a phase gear face plate 1126, which is also coupled to a phase slewing gear 1128. The bearing assembly 1124 includes a phase drive tube 1130. In preferred embodiments, the phase drive tube 1130 includes a ridge 1119 that couples to a ridge 1119 of a sliding phase plate 1132, which slides in the offset disk rails 1116 of the offset disk cam plate 1112.

The phase slewing gear 1128, the phase gear face plate 1126, the bearing assembly 1124, the amplitude slewing gear 1122, the amplitude gear spiral plate 1120, the sliding phase plate 1132, and the end disks 1104 remain concentric about the main shaft 106 during operation of the cross-flow turbine 102 and pitch control mechanism. The offset disk cam plate 1112, offset disk slewing bearing 1110, and the index foil link 1108 may by concentric or eccentric with respect to the main shaft 106 during operation of the cross-flow turbine 102 and pitch control mechanism. The foregoing may collectively be referred to herein as a "pitch control mechanism."

Figure 12A:
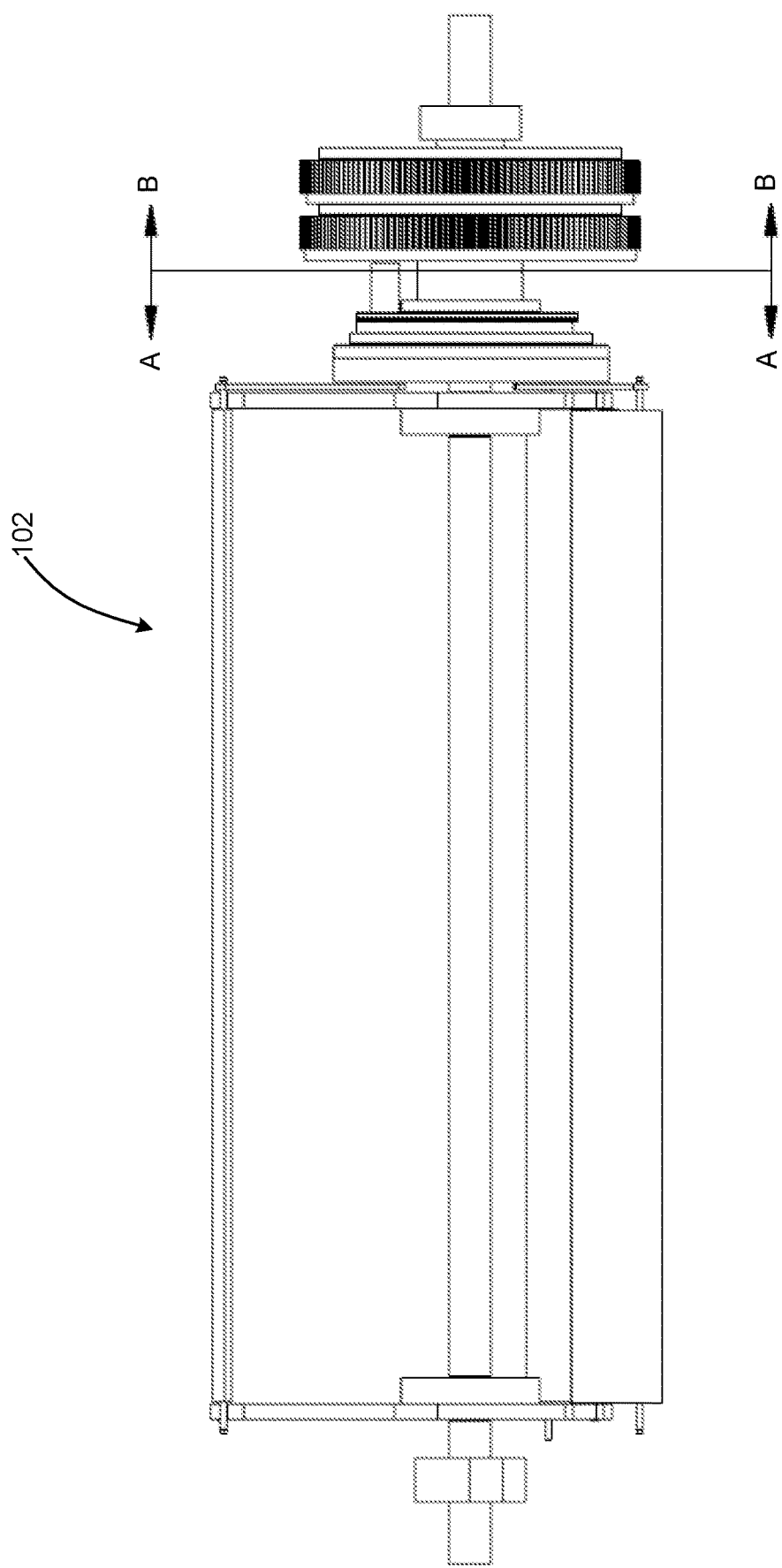
FIG. 12A is a side view of a cross-flow turbine including a pitch control mechanism configured at ninety degrees phase and zero degrees pitch, and cross-sectional planes A-A and B-B, according to embodiments of the present disclosure.
Figure 12C:
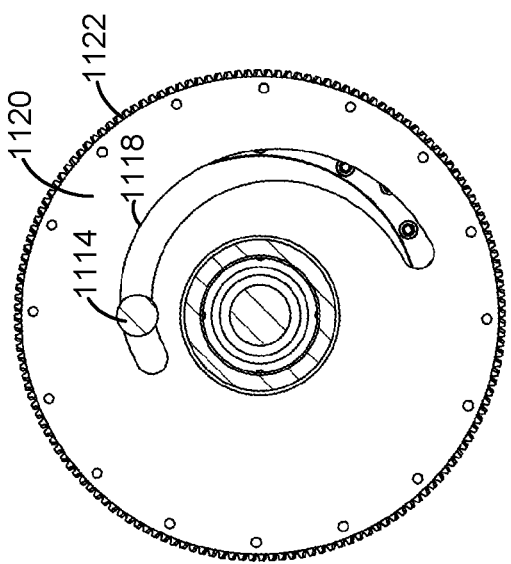
FIG. 12C is a cross-sectional view of the cross-flow turbine of FIG. 12A taken along the cross-sectional plane B-B according to embodiments of the present disclosure.
Figure 12B:
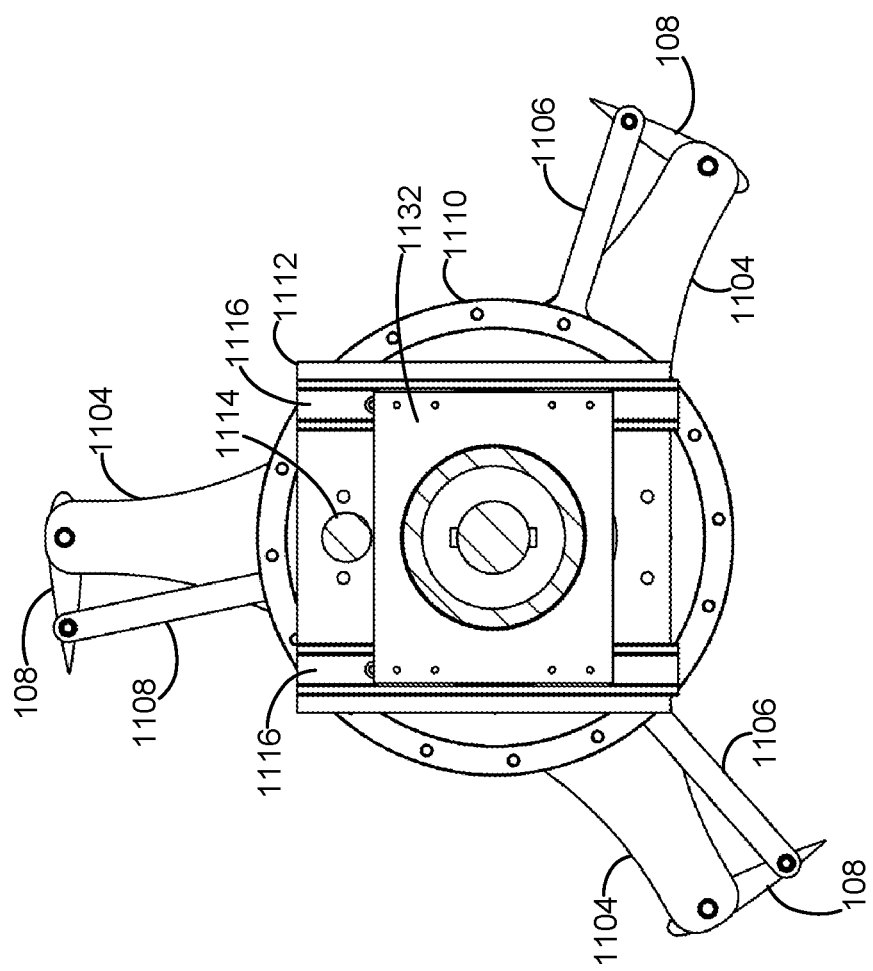
FIG. 12B is a cross-sectional view of the cross-flow turbine of FIG. 12A taken along the cross-sectional plane A-A according to embodiments of the present disclosure.

The operation and effects of a pitch control mechanism are described below with respect to FIGS. 12A through 13C. FIGS. 12A through 12C illustrate a cross-flow turbine 102 whereby the pitch control mechanism is configured at zero degrees (0°) pitch and ninety degrees (90°) phase.

To change the pitch experienced by the foils 108, the amplitude slewing gear 1122 is rotated, resulting in the amplitude gear spiral plate 1120 rotating, causing the cam follower 1114 to slide within the spiral slot 1118. The spiral slot 1118 is configured with one end of the spiral slot 1118 closer to a center of the amplitude gear spiral plate 1120 than another end of the spiral slot 1118. As a result, as the cam follower 1114 travels through the spiral slot 1118, the offset disk cam plate 1112, offset disk slewing bearing 1110, and index foil link 1108 change their concentric/eccentric relationship with respect to the main shaft 106. As the index foil link 1108 moves, the index foil link 1108 and the follower foil links 1106 act on respective foils 108, e.g., at three-quarter (¾) chord positions, which causes the foils 108 to rotate with respect to the end disks 1104, e.g., at the quarter (¼) chord positions.

Figure 13A:
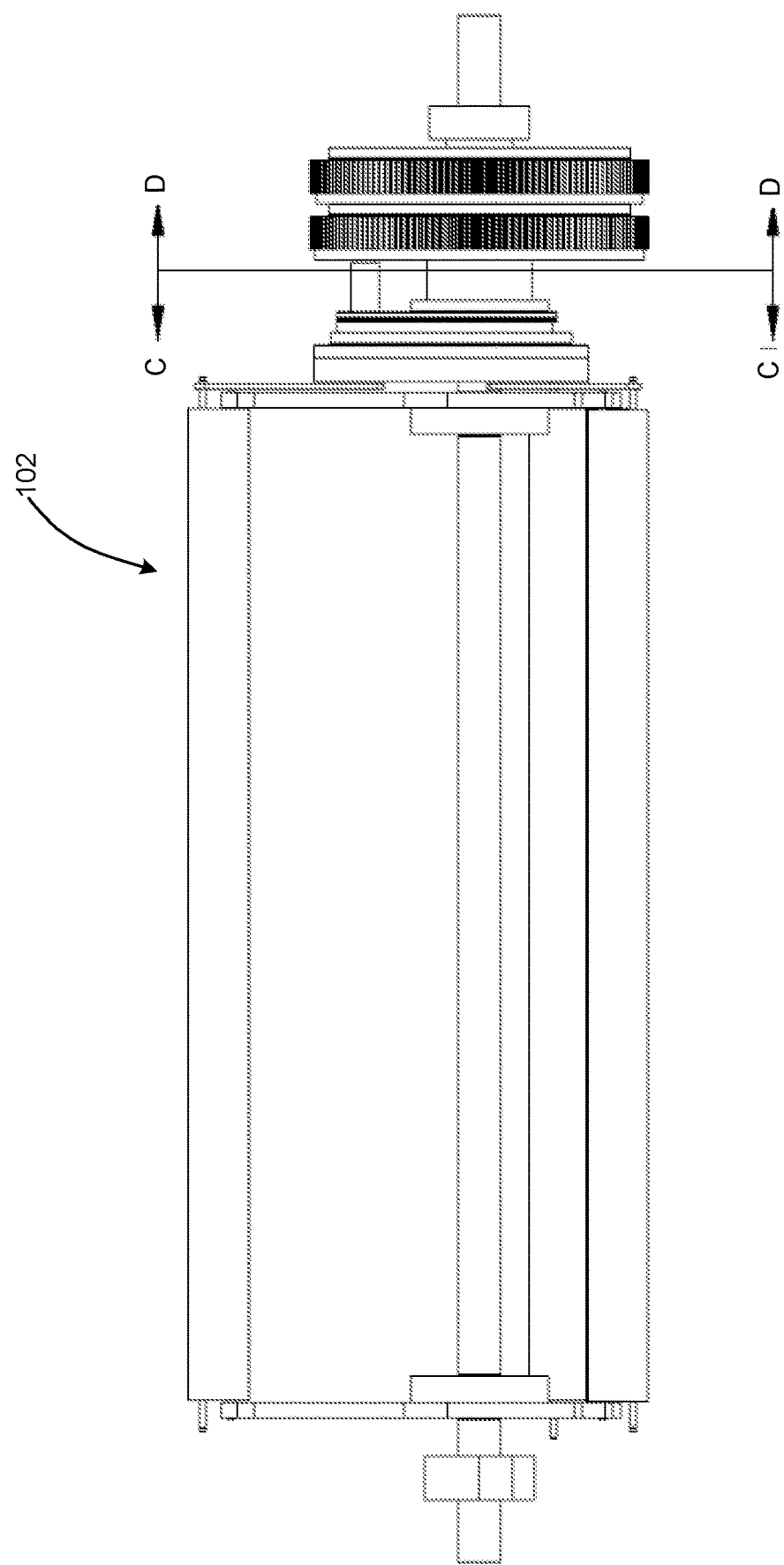
FIG. 13A is a side view of a cross-flow turbine including a pitch control mechanism configured at ninety degrees phase and thirty-six degrees pitch, and cross-sectional planes C-C and D-D, according to embodiments of the present disclosure.
Figure 13C:
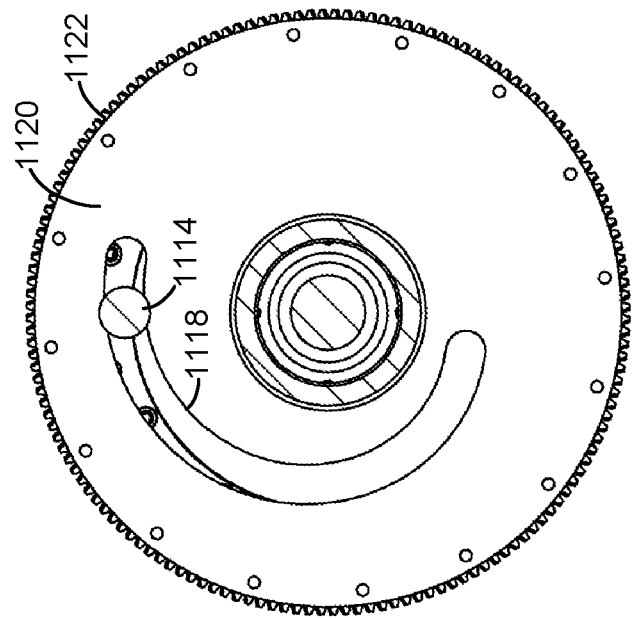
FIG. 13C is a cross-sectional view of the cross-flow turbine of FIG. 13A taken along the cross-sectional plane D-D according to embodiments of the present disclosure.
Figure 13B:
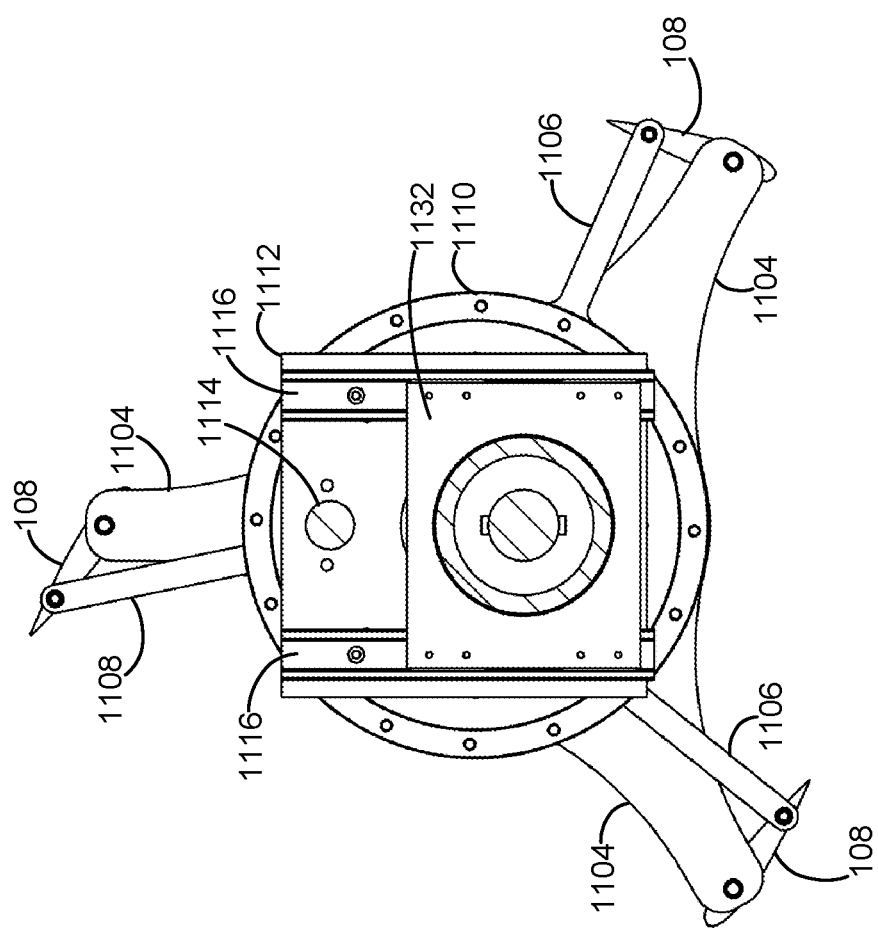
FIG. 13B is a cross-sectional view of the cross-flow turbine of FIG. 13A taken along the cross-sectional plane C-C according to embodiments of the present disclosure.

FIGS. 13A through 13C illustrate a pitch control mechanism configured at thirty-six degrees (36°) pitch and ninety degrees (90°) phase. It should be noted that the changing in pitch between FIGS. 12A-12C and 13A-13C results in different pitches of the foils 108 with respect to the main shaft 106. The amount of pitch that may be experienced by the foils 108 may be a function of how much the sliding phase plate 1132 may move with respect to the offset disk rails 1116 of the offset disk cam plate 1112.

Each foil 108 may experience different pitches as it rotates about a main shaft 106. The amount of pitch generated by a pitch control mechanism, e.g., thirty-six degrees (36°) as illustrated in FIGS. 13A through 13C, may be a measure of the pitch experienced by each of the foils 108 at a single position relative to the main shaft 106. For example, a foil 108 may experience a pitch of thirty-six degrees (36°) when the foil 108 is located at a position corresponding to ninety degrees (90°) phase. The foregoing pitching of the foils 108 at the single position relative to the main shaft 106 results in a pitch vector.

To change the phase, resulting in a thrust vector changing its direction, the phase slewing gear 1128 and the amplitude slewing gear 1122 are synchronously rotated, e.g., at the same speed for the same amount of time. Such rotation causes all components of the pitch control mechanism to maintain their configuration with respect to each other. As a result, the pitch of the foils 108 remains the same except the position with respect to the main shaft 106 that the foils 108 experience the pitch is changed based on how much the gears 1128/1122 are rotated. The phase slewing gear 1128 and the amplitude slewing gear 1122 may be actuated by one or more stepper motors.

By adjusting the pitch angle and phase of the foils 108 of a cross-flow turbine 102, thrust can be controlled to propel and steer an underwater vehicle.

The description of FIGS. 11 through 13B above relates to a single cross-flow turbine 102. One or more of the cross-flow turbines 102 of an underwater vehicle may include a respective pitch control mechanism. Thus, one skilled in the art will appreciate that the pitch control mechanisms of different cross-flow turbines 102 of an underwater vehicle may be operated to generate desired thrust vectors and thereby move the underwater vehicle through water.

Controlling the local angle of attack, or pitch angle, of a foil 108 could increase the energy generating efficiency of the cross-flow turbine 102. The energy generated can be delivered to an electricity grid or energy storage device, as is known to one of ordinary skill in the art.

With proper timing and active pitch control of foils 108, forces on the foils 108, e.g., lift and thrust, may be harnessed to provide forward thrust and lift forces on the underwater vehicle, and so may be used to provide propulsion for the underwater vehicle. With the provision of a suitable electrical supply, an underwater vehicle according to the present disclosure may be placed in the water near shore, propelled to a deployment location, actively lowered to the seafloor using its own propulsion system, and potentially arranged such that sufficient downward thrust is provided in operation to hold the underwater vehicle in place.

A pitch control mechanism of the present disclosure may be coupled to an electric motor, e.g., of a stepper motor type. Signals to the motor may be received from a pre-programmed sensor connected to a device or an electrical connection, e.g., wired or wireless, to the shore. Each pitch control mechanism of an underwater vehicle may be coupled to a different motor. The rotational position of a foil 108 may be determined by a control signal provided to the motor. The motor applies required torque to the pitch control mechanism to adjust foil pitch angle. Given that a pitching moment is generated by hydrodynamic forces acting upon the foils 108, it may be desirable for the motors to provide a counteracting torque to hold a given foil pitch position. This may require electrical power to be provided by the motors. Some rotations of foils 108 may cause this power to be consumed by the motor while other rotations of the foils 108 may cause generation of power. Net energy may be consumed by the motors.

By automatically adjusting the pitch angle of each foil 108 of a cross-flow turbine 102 along a rotational path of the foil 108, efficiency of the turbine can be improved to optimize the power-generating capabilities of the cross-flow turbine 102.

The pitch control mechanism described above is illustrative. One skilled in the art will appreciate that other techniques may be used to cause eccentricity of components about a main shaft 106 as well as various pitches to be achieved by foils 108. For example, a kinetic system, such as that used in a Voith-Schneider propeller, may be used.

An underwater vehicle may be controlled by a user using various control techniques. For example, a user may operate a joystick, keyboard, or other structure to control movement of the underwater vehicle and various subcomponents thereof. The structure the user interacts with may communicate with the underwater vehicle via a cable or wirelessly, for example using acoustic transmissions. In addition to signals being sent from the structure the user interacts with to the underwater vehicle, the underwater vehicle may send signals to the structure.

The nacelles and nacelle structures disclosed herein may be buoyant devices that enable an underwater vehicle to float in water. The nacelles and nacelle structures may alternatively be filled or emptied of ballast to lower or raise, respectively, the underwater vehicle in the water. Yet further, an underwater vehicle may be fixed to an ocean or other water floor, for example by a guideline(s).

The use of cross-flow turbines 102 with pitching mechanisms on an underwater vehicle, as described above, removes the need for heavy lift assets, thereby allowing for deployment across a broad range of tide and current conditions, and potentially allowing for smaller and more efficient foundations. This self-deploying nature of the underwater vehicles described herein offers the potential for significant reductions in project operation and maintenance costs.

The underwater vehicles disclosed herein may be staged onshore and deployed in relatively shallow water. In such uses, an electrical connection may be made between the underwater vehicle and a support vessel. The underwater vehicle may self-propel to a deployment location using power supplied by the support vessel. At some point, the power connection from the support vessel may disconnect from the underwater vehicle, e.g., when the underwater vehicle becomes connected to a pre-installed power cable running to the shore. The underwater vehicle may then self-propel itself to a seafloor and couple to a support frame on the seafloor on the underwater vehicle's own power. Once coupled to the support frame, the underwater vehicle may switch from a propulsion mode to a power generation mode, wherein a maximum pitch angle of the foils 108 may be changed so the underwater vehicle may generate power from movement of the surrounding water. The rotating cross-flow turbines 102 may turn a rotor of a generator, which generates electricity to charge the power storage device.

When a submerged underwater vehicle needs maintenance or inspection, the underwater vehicle may self-propel to the surface under power provided by a shore cable. A support vessel may be used to collect the underwater vehicle and escort it to shore for maintenance or inspection. Once complete, the underwater vehicle may self-propel using power from the support vessel as described above.

In certain implementations, an underwater vehicle may include a rechargeable power storage device, e.g., a battery pack, that provides sufficient power storage for the underwater vehicle to self-deploy. During a power generation mode, the power storage device is recharged by the underwater unit. The underwater unit can then use the stored power from the onboard power storage device to self-propel whenever necessary.

In addition to the advantages of being self-propelling, the underwater vehicles of the present disclosure may provide large thrust loads and, therefore, may be capable of lifting large weights under water. Thus, an underwater vehicle may also be used to deploy and retrieve other underwater vehicles or other components that may be desired to be placed on or removed from the seafloor. Moreover, an underwater vehicle may be deployed as an underwater vehicle to perform other tasks.

Variously configured underwater vehicles have been described. One skilled in the art will appreciate that components of the different underwater vehicles may be interchanged without departing from the present disclosure.

While the present disclosure includes specific embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present disclosure.

What is claimed is:

1. An autonomous turbine generator unit (ATGU), comprising:
   a cross-flow turbine comprising a plurality of foils spaced apart from a main shaft;
   a pitch control mechanism comprising a first slewing gear that remains concentric about the main shaft during operation, wherein rotation of the first slewing gear about the main shaft causes the plurality of foils to change pitch;
   a frame supporting the main shaft and enabling rotation of the cross-flow turbine; and
   a generator-motor set comprising rotor and stator elements, the rotor element being in rotary communication with the main shaft.

2. The ATGU of claim 1, wherein, in a generator mode, power is produced through rotation of the main shaft driven by rotation of the cross-flow turbine.

3. The ATGU of claim 1, wherein the pitch control mechanism comprises:
   a first series of components that remain concentric about the main shaft during operation; and
   a second series of components configured to establish an eccentric relationship relative to the main shaft during operation.

4. The ATGU of claim 1, further comprising:
   a second cross-flow turbine comprising a second plurality of foils spaced apart from a second main shaft, the second plurality of foils having pitch that is adjustable under control of a second pitch control mechanism.

5. The ATGU of claim 4, further comprising a gearbox that either:
   operates on the cross-flow turbine, or
   operates on the cross-flow turbine and the second cross-flow turbine.

6. The ATGU of claim 4, further comprising:
   an array of cross-flow turbines, the array of cross-flow turbines comprising:
      the cross-flow turbine extending along a first axis,
      the second cross-flow turbine extending along the first axis,
      a third cross-flow turbine comprising a third plurality of foils and a third pitch control mechanism, the third cross-flow turbine extending along a second axis parallel to the first axis, and
      a fourth cross-flow turbine comprising a fourth plurality of foils and a fourth pitch control mechanism, the fourth cross-flow turbine extending along the second axis.

7. The ATGU of claim 4, wherein the main shaft and the second main shaft extend along an axis.

8. The ATGU of claim 4, wherein the frame comprises a plurality of thrusters that provide stabilization with respect to rotation of the ATGU.

9. The ATGU of claim 1, wherein the frame comprises at least one nacelle that conditions flow of water for the cross-flow turbine.

10. The ATGU of claim 1, further comprising:
    control means for causing the cross-flow turbine to generate a thrust vector while in a motor mode.

11. The ATGU of claim 1, wherein:
    the pitch control mechanism comprises a second slewing gear that remains concentric about the main shaft during operation; and
    synchronized rotation of the first slewing gear and the second slewing gear causes each of the plurality of foils to experience a same pitch at different radial positions with respect to the main shaft, the same pitch results in different thrust vectors based on the different radial positions.

12. The ATGU of claim 1, wherein:
    each of the plurality of foils includes a first end providing a three-quarter (¾) chord support; and
    the pitch control mechanism acts upon the ¾ chord support to change pitch of the plurality of foils.

13. The ATGU of claim 12, wherein:
    a first ¾ chord support of a first foil is coupled to a first component capable of having an eccentric relationship relative to the main shaft during operation;
    a second ¾ chord support of a second foil is coupled to a first linking element, the first linking element being coupled to the first component; and
    a third ¾ chord support of a third foil is coupled to a second linking element, the second linking element being coupled to the first component.

14. An autonomous turbine generator unit (ATGU), comprising:
    a first cross-flow turbine comprising a first plurality of foils spaced apart from a main shaft, the first plurality of foils having pitch that is adjustable under control of a pitch control mechanism;
    a second cross-flow turbine comprising a second plurality of foils spaced apart from a second main shaft, the second plurality of foils having pitch that is adjustable under control of a second pitch control mechanism;

a frame supporting the main shaft and enabling rotation of the first cross-flow turbine;

a generator-motor set comprising rotor and stator elements, the rotor element being in rotary communication with the main shaft; and a gearbox that either:
  operates on the first cross-flow turbine; or
  the first cross-flow turbine and the second cross-flow turbine.

15. The ATGU of claim 14, wherein, in a generator mode, power is produced through rotation of the main shaft driven by rotation of the first cross-flow turbine.

16. The ATGU of claim 14, wherein the pitch control mechanism comprises:
  a first series of components that remain concentric about the main shaft during operation; and
  a second series of components configured to establish an eccentric relationship relative to the main shaft during operation.

17. The ATGU of claim 14, wherein the frame comprises at least one nacelle that conditions flow of water for the first cross-flow turbine.

18. The ATGU of claim 14, further comprising:
  control means for causing the first cross-flow turbine to generate a thrust vector while in a motor mode.

19. The ATGU of claim 6, wherein:
  the pitch control mechanism comprises a first slewing gear that remains concentric about the main shaft during operation; and
  rotation of the first slewing gear about the main shaft causes the first plurality of foils to change pitch.

20. The ATGU of claim 19, wherein:
  the pitch control mechanism comprises a second slewing gear that remains concentric about the main shaft during operation; and
  synchronized rotation of the first slewing gear and the second slewing gear causes each of the first plurality of foils to experience a same pitch at different radial positions with respect to the main shaft, the same pitch results in different thrust vectors based on the different radial positions.

21. The ATGU of claim 14, wherein:
  each of the first plurality of foils includes a first end providing a three-quarter (¾) chord support; and
  the pitch control mechanism acts upon the ¾ chord support to change pitch of the first plurality of foils.

22. The ATGU of claim 21, wherein:
  a first ¾ chord support of a first foil is coupled to a first component capable of having an eccentric relationship relative to the main shaft during operation;
  a second ¾ chord support of a second foil is coupled to a first linking element, the first linking element being coupled to the first component; and
  a third ¾ chord support of a third foil is coupled to a second linking element, the second linking element being coupled to the first component.

23. The ATGU of claim 14, further comprising:
  an array of cross-flow turbines, the array of cross-flow turbines comprising:
    the first cross-flow turbine extending along a first axis,
    the second cross-flow turbine extending along the first axis,
    a third cross-flow turbine comprising a third plurality of foils and a third pitch control mechanism, the third cross-flow turbine extending along a second axis parallel to the first axis, and
    a fourth cross-flow turbine comprising a fourth plurality of foils and a fourth pitch control mechanism, the fourth cross-flow turbine extending along the second axis.

24. The ATGU of claim 14, wherein the main shaft and the second main shaft extend along an axis.

25. The ATGU of claim 14, wherein the frame comprises a plurality of thrusters that provide stabilization with respect to rotation of the ATGU.

* * * * *

UNITED STATES PATENT AND TRADEMARK OFFICE
CERTIFICATE OF CORRECTION

| | | |
|---|---|---|
| PATENT NO. | : 11,946,442 B2 | Page 1 of 1 |
| APPLICATION NO. | : 16/975554 | |
| DATED | : April 2, 2024 | |
| INVENTOR(S) | : Jarlath McEntee et al. | |

It is certified that error appears in the above-identified patent and that said Letters Patent is hereby corrected as shown below:

In the Specification

In Column 1, Line 3, please insert the following paragraph:
--GOVERNMENT SUPPORT
This invention was made with Government support under DE-AR0000658 awarded by The Department of Energy (FOA: DE-FOA-0001261). The Government has certain rights in this invention.--

Signed and Sealed this
Thirtieth Day of December, 2025

John A. Squires
*Director of the United States Patent and Trademark Office*